United States Patent [19]

Sommerfeld

[11] 4,076,675
[45] Feb. 28, 1978

[54] AQUEOUS COATING COMPOSITION FROM AMINOPLAST AND REACTION PRODUCT OF TERTIARY AMINE AND POLYMER CONTAINING RANDOMLY DISTRIBUTED EPOXY GROUPS

[75] Inventor: Eugene G. Sommerfeld, Penn Valley, Pa.

[73] Assignee: E. I. Du Pont de Nemours and Company, Wilmington, Del.

[21] Appl. No.: 547,001

[22] Filed: Feb. 4, 1975

[51] Int. Cl.$^2$ .................... C08L 37/00; C08L 61/28; C25D 13/06
[52] U.S. Cl. ................ 260/29.4 UA; 204/181 C; 260/29.6 HN; 260/834; 427/410; 428/416; 428/418; 526/16; 526/49
[58] Field of Search ............ 260/29.2 EP, 47 EP, 260/29.4, 834, 29.4 UA

[56] References Cited

U.S. PATENT DOCUMENTS

| | | | |
|---|---|---|---|
| 2,676,166 | 4/1954 | Webers | 260/86.1 N |
| 3,301,804 | 1/1967 | Zora et al. | 260/29.2 EP |
| 3,336,253 | 8/1967 | Wong et al. | 260/29.2 EP |
| 3,429,839 | 2/1969 | Franco | 260/47 EP |
| 3,619,398 | 11/1971 | Bosso et al. | 260/29.2 EP |
| 3,751,376 | 8/1973 | Quentin | 260/47 EP |
| 3,769,250 | 10/1973 | Nikles | 260/29.2 EP |
| 3,793,278 | 2/1974 | DeBona | 260/29.2 EP |
| 3,839,252 | 10/1974 | Bosso et al. | 260/29.2 EP |
| 3,882,009 | 5/1975 | Wagener et al. | 204/181 |
| 3,928,156 | 12/1975 | Wismer et al. | 204/181 |
| 3,936,405 | 2/1976 | Sturni et al. | 260/29.2 EP |
| 3,937,679 | 2/1976 | Bosso et al. | 260/29.3 |
| 3,954,588 | 5/1976 | Hazan et al. | 204/181 |
| 3,959,106 | 5/1976 | Bosso et al. | 204/181 |
| 3,962,165 | 6/1976 | Bosso et al. | 260/29.2 EP |

*Primary Examiner*—Murray Tillman
*Assistant Examiner*—A. H. Koeckert

[57] ABSTRACT

A water-borne thermosetting coating composition comprising a stable dispersion or solution of:
(A) a polymer containing randomly distributed epoxy groups reacted with
(B) a tertiary amine; and
(C) a nitrogen resin is provided. Such composition is useful for spray-, flow-, dip-, roller-, and electro-coating metal and paper substrates and provides coatings of improved properties, including high degree of flexibility during machining and stamping of the coated articles, corrosion resistance, gloss, hydrolytic stability, and non-adulterating of foods and beverages in contact therewith.

21 Claims, No Drawings

AQUEOUS COATING COMPOSITION FROM AMINOPLAST AND REACTION PRODUCT OF TERTIARY AMINE AND POLYMER CONTAINING RANDOMLY DISTRIBUTED EPOXY GROUPS

BACKGROUND OF THE INVENTION

This invention is related to a water-borne coating composition of general utility in coating metallic substrates, for example in automotive and coil coatings applications. More particularly, the coating composition is useful as an interior and exterior can coating.

The can coating industry utilizes a variety of thermosetting coating compositions designed to fulfill various requirements dictated by the intended use. Cans are usually coated on their interior by a thin coating designed to protect the metal walls from attack by food or beverage, and vice versa, to be stored therein. Such coatings should have among other properties good adhesion to the metal walls, low extractables and sorption to prevent taste adulteration, and a rapid cure rate for an economical manufacturing process.

The coatings of the prior art are thermosetting compositions often dissolved or dispersed in organic solvents. Among commonly utilized thermosetting compositions are those based on epoxy resins crosslinked with nitrogen resins, usually in an acid catalyzed process.

Increased awareness of the environmental hazards of allowing organic solvent vapors to enter the atmosphere, the desirability of a single system that can be applied not only by the more conventional techniques of spray, roller or flow coating but also by electrodeposition, and the economy resulting from the substitution of water for some or all of the solvents in a coating composition, are all factors mitigating in favor of water-borne coating compositions.

U.S. Pat. No. 2,676,166, issued Apr. 20, 1954 to V. J. Webers, shows the conversion, through the use of tertiary amines, of some random low molecular weight hydrophilic copolymers of oxirane containing monomers with other ethylenically unsaturated monomers into water soluble materials. These polymers contain a large number of hydroxyl and quaternary ammonium groups per molecule.

In U.S. Pat. No. 3,839,252, issued Oct. 1, 1974 to J. E. Bosso et al., there are described water dispersible products of epoxy resins with amine salts. These products are designed to contain at least one unreacted 1,2-epoxy group per molecule and also contain in the resin quaternary ammonium salt groups.

The composition of this invention is an aqueous solution or dispersion of the reaction product of a terminally functional epoxy resin with a tertiary amine and a nitrogen resin crosslinking agent. These aqueous solutions or dispersions of the polymeric quaternary ammonium hydroxide and a nitrogen resin are stable both uncatalyzed or catalyzed and can be applied to metallic substrates by spray, roller, dip or flow coating or by electrodeposition at the cathode and to paper.

SUMMARY OF THE INVENTION

According to the present invention there is provided a water-borne thermosetting coating composition consisting essentially of:
(A) 50–97 parts by weight, based on the weight of components (A) plus (C), of an epoxy resin containing, on the average, more than two randomly distributed 1,2-epoxy groups per molecule and having a molecular weight range of 470–2,000 or 25,000–75,000 reacted with
(B) an aqueous solution of 0.75–1.25 equivalents of a tertiary amine per equivalent of 1,2-epoxy groups in the polymer; and
(C) 3–50 parts by weight, based on the weight of components (A) plus (C), of a nitrogen resin crosslinking agent;
wherein components (A), (B), and (C) comprise about 0.1–50% by weight of the coating composition and the remainder is comprised of water and organic liquid(s) in a ratio of from 70:30 to 90:10 and said coating composition having a pH of 7.5 or above.

DESCRIPTION OF THE INVENTION

The water-borne thermosetting coating composition of this invention is a solution or dispersion of the reaction product of a polymer containing randomly distributed epoxy groups, hereafter referred to as an epoxy polymer, and a tertiary amine and a nitrogen resin crosslinking agent. By utilizing aqueous solutions of highly specific tertiary amines such as dimethyl ethanol amine and epoxy polymers such as the polyglycidyl ethers of novolac resins or other polymers containing pendent 1,2-epoxy groups, a stable water soluble or dispersible polymeric quaternary ammonium hydroxide results. Addition of a nitrogen-resin crosslinking agent, acting also as a solubilizing agent, affords a solution or dispersion which is stable at room temperature and is infinitely dilutable with water.

Whether the coating composition is a solution or a dispersion is largely dependent on the nature of the particular nitrogen resin and amine used. Even when the composition is opaque some of the resinous components may be dissolved and when the composition appears to be a clear solution it is possible that small amounts of the components are in a dispersed state. For sake of simplicity hereafter the term "dispersion" will be used to denote the water-borne coating composition.

The dispersion as prepared has a pH of above 10 and a non-volatile content of up to 50% by weight. It has excellent wetting properties when applied to metal substrates and, upon curing, a glossy, highly solvent resistant coating is obtained. It is also useful as a coating for paper.

The epoxy polymers to be utilized in the present invention are commonly known in the art. One class of such polymers has the generalized formula

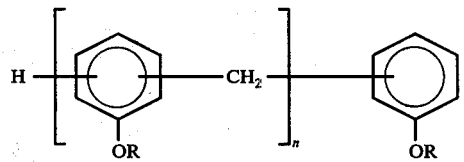

wherein R is a hydrogen atom or a glycidyl group and the average value of $n$ is 2–11; the molecular weight range is 470–2,000 and is known in the art as polyglycidyl ethers of novolac resins.

One such preferred epoxy polymer is "Epon 154" (available from Shell Chemical Company) where $n > 2$, has an epoxy equivalent of 176–181, and has a Brookfield viscosity at 52° C of 3,500–7,000 centipoises (Spindle No. 3, 20 revolutions per minute). The epoxy equivalent is defined as the grams of polymer containing 1 gram-equivalent of epoxide as measured by ASTM-D-1652. The coating composition containing "Epon 154" affords a glossy, flexible, chemically resistant film. Another preferred epoxy polymer is "5156" (available from the Celanese Corporation), having an epoxy equivalent of 185 and a Brookfield viscosity at 52° C of 100,000 centipoises. The coating composition containing "5156" affords glossy, tough, flexible films upon cure.

Another suitable novolac-based epoxy resin is "QX-2174" (product of the Dow Chemical Company), having an epoxy equivalent of 226-238 and a Durran's melting point of 50°-60° C.

Still another useful polymer is "QX-2174-1" (also from Dow Chemical Company), epoxy equivalent 230-245, Durran's melting point 65°-75° C.

Yet a further example of the useful polyglycidyl ethers of the phenol/formaldehyde novolacs is "ERR-0100" (a product of the Union Carbide Plastics Corporation), where $n=5$, the epoxy equivalent is 190-220, and the Durran's melting point is 85°-100° C.

Another class of polymers that can be utilized in the present invention comprises polymers prepared from various ethylenically unsaturated monomers and epoxy-functional monomers such as glycidyl esters of acrylic acid, methacrylic acid, the mono- and/or diglycidyl esters of maleic acid, fumaric acid, and itaconic acid, allyl glycidyl ether, vinyl glycidyl ether, and the like. Among the useful ethylenically unsaturated monomers are the alkyl- and hydroxyalkyl esters of acrylic and methacrylic acids, the vinyl aromatic monomers, the vinyl esters, (meth)acrylonitrile, (meth)acrylamide, (meth)acrylic acid, itaconic acid, and mixtures thereof.

These polymers are in the 25,000-75,000 number average molecular weight range (as determined by gel permeation chromatography using a polystyrene standard), have an epoxy equivalent of 500-2,500, and contain, on the average, 10-150 1,2-epoxy groups per molecule.

A preferred class of these polymers is styrene/alkyl (meth)acrylate/hydroxyalkyl (meth)acrylate/glycidyl (meth)acrylate, in the weight ratios of 20-60/60-20/0-10/10-20. Generally, the acrylic esters contain an alkyl group of 1-8 carbon atoms, the methacrylic esters contain an alkyl group of 2-8 carbon atoms, and the hydroxy-alkyl (meth)acrylate can be hydroxyethyl acrylate, hydroxypropyl acrylate, hydroxyethyl methacrylate or hydroxypropyl methacrylate. For example, a polymer, having the approximate composition by weight, of styrene/ethyl acrylate/hydroxyethyl acrylate/gylcidyl methacrylate/39/39/8/14, an approximate weight average molecular weight of 25,000, and an approximate epoxy equivalent of 1,000, is useful in a can coating composition.

Another preferred class is styrene and/or methyl methacrylate/alkyl (meth)acrylate/hydroxyalkyl (meth)acrylate/gycidyl (meth)acrylate, in the weight ratios of 20-60/60-20/0-10/10-20. Generally the acrylic esters contain an alkyl group of 1-8 carbon atoms, the methacrylic esters contain an alkyl group of 2-8 carbon atoms, and the hydroxyalkyl (meth)acrylate can be hydroxyethyl acrylate, hydroxypropyl acrylate, hydroxyethyl methacrylate or hydroxypropyl methacrylate. For example, a polymer, having the approximate composition by weight of methyl methacrylate/butyl acrylate/hydroxyethyl acrylate/glycidyl methacrylate/39/39/8/14, an approximate weight average molecular weight of 25,000, and an approximate epoxy equivalent of 1,000, is useful in an automotive coating composition.

These polymers can be prepared by conventional polymerization techniques, for example, in solution, using azo- or peroxy-initiators and conventional solvents.

The epoxy polymer comprises 50-97 parts by weight of the film-forming components of the coating composition and preferably 65-85 parts. One preferred composition contains 75 parts of an epoxy polymer.

During the preparation of the coating composition of this invention a solution of an epoxy polymer in organic liquid(s) is brought in contact with an aqueous solution of a tertiary amine. A wide variety of organic liquids can be used to dissolve the epoxy polymers. Among the most commonly used solvents are alcohols such as isopropanol, the butyl alcohols, 2-hydroxy-4-methylpentane, 2-ethylhexyl alcohol, cyclohexanol, glycols such as ethylene glycol, diethylene glycol, 1,3-butylene glycol, ether alcohols such as ethylene glycol mono-ethyl ether, ethylene glycol mono-butyl ether, diethylene glycol mono-methyl ether, mixtures thereof, and many aliphatic and aromatic hydrocarbons if used admixed with at least one of the above.

The reaction of tertiary amines with materials containing epoxy groups, to yield adducts containing quaternary ammonium groups, is known. Such reaction, when carried out in presence of water, can afford a product that contains both a hydroxyl group and a quaternary ammonium hydroxide. The reaction can be represented schematically as follows:

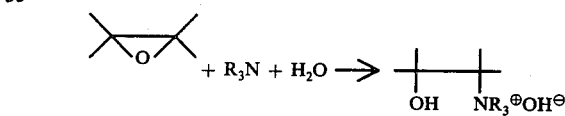

While most tertiary amines react with epoxy polymers to form quaternary ammonium hydroxides, the preparation of the quaternary ammonium hydroxides to be utilized in the water-borne coating composition of this invention is carried out utilizing at least one tertiary amine selected from the group: $R_1R_2R_3N$, N-methyl morpholine, N-methyl pyrrolidine, pyridine, N-methyl pyrrole, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1-4 carbon atoms. Some examples of $R_1R_2R_3N$ are: trimethyl amine, dimethyl ethanol amine, diethyl methyl amine, methyl diethanol amine, ethyl methyl ethanol amine, dimethyl ethyl amine, dimethyl propyl amine, dimethyl 3-hydroxy-1-propyl amine, dimethyl benzyl amine, dimethyl 2-hydroxy-1-propyl amine, dimethyl 1-hydroxy-2-propyl amine, and mixtures thereof. Most preferably trimethyl amine or dimethyl ethanol amine is used.

While the exact mode of the reaction is not fully understood, it is believed that the efficiency of the amines utilized is related to steric factors. The amount of tertiary amine used is determined by the epoxy equivalent of the particular epoxy polymers employed and is at least 0.75 equivalent, and preferably between 0.9 and 1.1 equivalent, per epoxy group. At lower levels of amine use the residual epoxy groups of the epoxy polymers are subject to further reaction in the highly basic reaction medium. Such further reaction can lead to a crosslinked system prior to the addition of the nitrogen resin crosslinking agent or it can lead to storage instability and premature gelation of the coating composition. In a preferred embodiment equivalent amounts of epoxy polymer and tertiary amine are used resulting in substantially complete consumption of the epoxy groups. Such a reaction, when the starting epoxy polymer contains an average of more than two epoxy groups, affords a polymeric quaternary ammonium hydroxide having more than two such groups and the same number of hydroxyl groups.

The tertiary amine and water are admixed with a solution of the epoxy polymers. The exact ratio of the amine and water is not critical but one preferred ratio of amine to water is approximately 1:2 by weight. At the end of the reaction period between the epoxy polymer and the tertiary amine the product is a solution at the reaction temperature. The reaction can be carried out between room temperature and below the boiling point of the reaction medium, preferably between 50°–95° C, and most preferably between 70°–80° C. In this temperature range there is a rapid rate of reaction without complicating side reactions.

Further dilution with water of the solution of the epoxy polymer-tertiary amine adduct, at the reaction temperature, can be carried out. In one embodiment a quaternary ammonium hydroxide remains in solution at about 75° C in a liquid medium comprising an approximately 75:25 weight ratio of organic liquid and water. Such a solution, however, has a tendency to separate into two phases upon cooling to room temperature. In another embodiment, using trimethyl amine, the solution remains in a single phase even at room temperature.

The water-borne thermosetting coating composition of this invention is a stable solution or dispersion, even at room temperature, and comprises a nitrogen resin crosslinking agent together with a polymeric quaternary ammonium hydroxide.

The nitrogen resins often referred to as alkylated amine-aldehyde resins and alkylated amide-aldehyde resins, are well known. They are the alkylated products of amino-resins prepared by the condensations of at least one aldehyde with at least one of urea, N,N′-ethyleneurea, dicyandiamide, and aminotriazines such as melamines and guanamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino-resins are alkylated with at least one and up to and including six alkanol molecules containing 1-6 carbon atoms. The alkanols can be straight chain, branched or cyclic.

Among the preferred nitrogen resins are partially methylated melamines, partially butylated melamines, hexaethoxymethylmelamine, hexamethoxymethylmelamine, dimethoxytetraethoxymethylmelamine, dibutoxytetramethoxymethylmelamine, butylated benzoguanamide, partially methylated urea, fully methylated urea, fully butylated urea, hexabutoxymethylmelamine, and mixtures thereof. In one preferred embodiment, utilizing a partially methylated melamine, the composition of this invention has excellent wetting properties on metals such as aluminum or tin-free steel. The cured coatings based on this composition are glossy, show little or no cratering, and are resistant to solvent.

The nitrogen resin crosslinking agents help to solubilize the polymeric quaternary ammonium hydroxide adducts and help to stabilize the resulting water-borne coating composition. These nitrogen resins comprise 3–50 parts by weight of the film-forming components of the coating composition of this invention and preferably 15–35 parts. One preferred embodiment contains the product of 75 parts of an epoxy polymer with an equivalent amount of a tertiary amine and 25 parts of a nitrogen resin.

The water-borne composition of this invention is stable and is a dispersion or, depending on the particular nitrogen resin utilized, a substantially clear solution. When hexabutoxymethylmelamine is used the coating composition is a stable dispersion capable of being applied by any of the conventional techniques such as spray or roller coating or by electrodeposition. When a partially methylated melamine or hexamethoxymethylmelamine is used the coating composition is a clear solution even at room temperature and is also capable of being applied by a variety of techniques.

The coating compositions of this invention can be cured thermally. After the composition has been applied to the substrate, baking at elevated temperature brings about the desired crosslinking. Temperatures of 150° C to 260° C, for 0.1 to 30 minutes, are typical baking schedules utilized.

Optionally non-volatile acid catalysts are included in the coating composition to increase the rate of cure. By non-volatile acid catalyst is meant an acid catalyst that remains in the cured film. The acid catalyst can be particularly important when a fully alkylated nitrogen resin crosslinking agent such as hexamethoxymethylmelamine is utilized. Among useful acid catalysts are phosphoric acid, its mono- and di- esters formed with aliphatic, cycloaliphatic, and aromatic alcohols, citric acid, and para-toluenesulfonic acid. Mixtures of these can also be used. The final pH of the coating composition is determined by the concentration of the acid used and is determined on the basis of the rate of cure desired and the type of nitrogen resin crosslinking agent used.

The pH of the thermosetting coating compositon is above 10 as prepared. The composition can be cured at this pH is desired. A particular advantage resulting from this ability to cure films, resulting from a liquid coating composition of high pH values, is the improved wetting of the water-borne system on metal substrates under many practical application conditions such as when unclean, oily surfaces are coated.

When acid catalysts are added to the coating composition the final pH of the system is lowered in accordance with the needs of the components of the system, the lower pH being necessary for the more fully alkylated nitrogen resins. When a completely alkylated crosslinking agent is used the final pH of the coating composition is adjusted to between 7.5 and 12, preferably to between 9 to 10. Utilizing a coating composition of this invention there is no need to lower the pH of the system to the acid side, unless very rapid cure is required. Corrosion, often common to acidic coating compositions, can be thereby avoided.

The water-borne composition can be applied by a variety of techniques and to a variety of substrates known in industry. For example, the coating composition of this invention can be utilized in the can manufacturing industry which utilizes mainly metallic cans, many of them cylindrical, made from aluminum, tin-free steel, electrolytic tin-plate, and quality-as-rolled steel, among others. Cans utilized for packaging and shipping food and beer or other beverages are mostly of the three-piece or the two-piece drawn-and-ironed (D and I) variety. Cans constructed from three pieces (body, top, and bottom) can be roller coated before the metallic sheet is formed into the body of the can or can be spray coated after partial fabrication. The D and I cans, where the metal sheet is stamped to form a cylindrical body closed at one end, are generally spray coated.

The thermosetting coating composition of this invention can also be electrocoated. In the electrodeposition process the water-borne composition is placed in contact with an electrically conductive cathode and an electrically conductive anode, with the surface to be coated being the cathode. During the process an adherent film of the coating composition is deposited on the cathode. The nitrogen resin crosslinking agent also migrates, in a possible physical entanglement with the polymeric quaternary ammonium hydroxide, to the cathode.

The conditions under which the electrocoating is carried out are similar to those used in the electrodeposition of other types of coatings. The applied voltage can be varied, can range from 1 to 1000 volts, and is typically between 25 and 500 volts. The current density is usually between about 1 milliampere and 100 milliamperes per square centimeter. The current density tends to decrease during the coating process as the coating thickness increases. The coating time can vary from 1 to 120 seconds or longer and is typically between 1 and 5 seconds for coating cans.

The concentration of the coating composition depends upon the process parameters to be used and is not generally critical. Ordinarily the film-forming components comprise 0.1–50 and preferably 5–30% for conventional coating methods and 1–20% for electrodeposition of the total, the remainder being water and organic liquid(s). The latter are present in a ratio of from 90:10 to 70:30.

The freshly deposited films are capable of being immediately crosslinked without regard to the method of coating used to obtain them.

The water-borne thermosetting coating composition of this invention is useful in a variety of applications. This coating composition finds particular utility in the can industry where the composition can be applied to the interior of two-piece drawn-and-ironed and three-piece beer and beverage cans, to the exterior of three-piece beer and beverage cans, to the interior and/or exterior ends of two- or three-piece cans or two- or three-piece sanitary cans. When the coating composition of this invention is applied to the interior of food and beer or beverage cans by spray-coating, a thin uniform film is deposited which, after curing, corresponds to a coating weight of 0.3 to 1.3 milligrams per square centimeter (2–8 milligrams per square inch).

The composition can also be used as a paper coating. A glossy coating results when the pH of the coating composition is adjusted to approximately six and the coated substrate is baked for 5–10 seconds at 150° C.

The water-borne composition also has utility in automotive, applicance and coil coating applications, the final coated articles having especially desirable corrosion, salt-spray, acid, base, stain, and detergent resistance properties.

The coating composition can also be used as a primer for metallic substrates. A wide variety of topcoats can be used after the primer has been partially or completely cured. Among the useful topcoats are polyvinyl chloride, vinyl chloride copolymerized with one or more of the following: fumaric acid and/or its methyl, ethyly, butyl, or octyl ester, a hydroxy-modified vinyl chloride/vinyl acetate copolymer post-reacted with trimellitic anhydride, and acrylic polymers.

After application and curing the coating composition of this invention can be tested, among other properties, for flexibility, adhesion, for pasteurization and processing resistance, for resistance to boiling water and solvents, and for its effect on taste.

The following are convenient procedures for carrying out the various tests. The tests can be carried out on paper, test panels or finished cans, coated and cured in a 205°–216° C/1–10 minute or 150° C/5–10 second cure cycle.

Pasteurization Resistance: A sample of a coated panel is immersed in water at 66° C for 30 minutes. For a coating to be acceptable there must be no blistering, softening, "blush" or loss of adhesion.

Boiling Water Resistance: A coated panel is immersed in boiling water for 30 minutes. Again, no blistering, softening or loss of adhesion is permitted and no "blush" is allowed.

Flexibility: A coated panel is subjected to 180 degree bending. No cracking of the film or loss of adhesion should take place for the coating to be acceptable. No cracking or loss of adhesion is permissible during the fabrication of can ends.

Solvent Resistance: A sample coated panel is mechanically rubbed 100 times with cloth soaked in methyl ethyl ketone. A passing sample will show no dissolution of, delamination of, or penetration through, the film by the solvent after 100 strokes.

Taste Test: A simulated coated panel (aluminum foil), representing the interior surface area of a can, is inserted into a twelve-ounce soda bottle filled with spring water and the bottle is capped. The contents of the bottle are pasteurized at 66° C for thirty minutes and stored in a 40° C oven for 5 days. The bottle is cooled to room temperature and the contents are tested by a taste panel comparing to water stored without a coated panel. An acceptable coating will give no taste to the water.

Extractables: This test is carried out according to guideline extraction methods as specified in the 1966 Supplement to the Code of Federal Regulations, issued by the Food and Drug Administration (see Title 21, Section 121.2514).

Processing Resistance: A coated panel or a coated fabricated end is placed in a partially water-filed pressure cooker for ninety minutes at approximately 120° C. No blistering, softening or loss of adhesion is permitted after this period. No "blush" is allowed.

The invention can be further understood by referring to the following examples in which parts and percentages are by weight, unless otherwise indicated.

EXAMPLE 1

(a) Into a suitable equipped reaction vessel are charged the following ingredients: styrene, 78 grams; ethylacrylate, 78 grams; hydroxyethyl acrylate, 16 grams; glycidyl methacrylate, 28 grams; 2-butoxy 1-ethanol, 162 grams, and ditertiary-butyl peroxide, 1 gram. The contents of the vessel are brought to reflux temperature and maintained at this temperature for 1.5 hours. After this period an additional 1 gram of ditertiary-butyl peroxide is added and heating is continued for 1 hour, after which time a further 1 gram of ditertiary-butyl peroxide is added and refluxing is maintained for an additional 1.5 hours. One skilled in the art expects the product of this polymerization to be a styrene/ethyl acrylate/hydroxyethyl acrylate/glycidyl methacrylate//39/39/8/14 (by weight), 55% solids content.

(b) Heat a 335 gram portion of the polymer, as prepared in (a) above to between 65° and 70° C. Add a solution of dimethyl-ethanol amine, 18.4 grams, in water, 36.7 grams. Maintain temperature at 70° to 75° C for 15 minutes followed by the addition of a partially methylated melamine (89% solids in iso-propanol, available from the Monsanto Polymers and Petrochemicals Company under the trade name of Resimene 740), 69.4 grams. After 15 minutes at 60° to 70° C, water, 491 grams, is added over a 30-minute period. The final solution has a 26.0% solids content as determined at 204° C for 10 minutes and a pH of 12.3. A film drawn with a Number 20 wire-sound rod on an aluminum sheet and cured at 204° C for 10 minutes is expected to be tough, glossy, and to pass 50 + strokes methyl ethyl ketone solvent resistance test.

EXAMPLE 2

To a 475-gram portion of the solution of Example 1b is added phosphoric acid, 4 grams, dissolved in a 3:1 by weight mixture of water and 2-butoxy-1-ethanol, 22.7 grams. The pH of this solution is 9.3 and the solids content is 25.4%, determined as above. Casting and curing affords a film that passes 100 plus strokes with methyl ethyl ketone.

EXAMPLE 3

To a molten mass of a polyglycidyl ether of a novolac resin ("Epon 154"), 209.3 grams, and diethylene glycol monobutyl ether, 26.2 grams, at 65° to 70° C, is added a solution of dimethyl ethanol amine, 104.1 grams, in water, 208.2 grams. An exothermic reaction ensues with a concomitant temperature rise to 90° C within 4 minutes. The resultant clear solution is cooled to 70° C and dibutoxytetramethoxymethylmelamine, 89.7 grams, is added over a 15-minute period, followed by a 30-minute addition of water, 307 grams. The pH of the solution is adjusted by the addition of phosphoric acid, 50.5 grams; water 161.7 grams; and diethylene glycol monobutyl ether, 40.4 grams. The solution has a 29.1% solids content and a pH of 9.0. Casting the solution and curing at 204° C for 10 minutes results in a glossy, tough film.

What is claimed is:

1. A water-borne thermosetting coating composition consisting essentially of:
   (A) 50–97 parts by weight, based on the weight of components (A) plus (C), of an epoxy polymer containing, on the average, 10–150 randomly distributed 1,2-epoxy groups per molecule and having a weight average molecular weight, determined by gel permeation chromatography, using a polystyrene standard, of 25,000–75,000; reacted to the substantially complete consumption of the epoxy groups with
   (B) an aqueous solution of about 1–1.25 equilvalents, per equivalent of epoxy group of said epoxy polymer of (A), of a tertiary amine selected from the group consistinng of $R_1R_2R_3N$, pyridine, N-methylpyrrole, N-methyl pyrrolidine, N-methyl morpholine, and mixtures thereof and where $R_1$ and $R_2$ are hydroxy-substituted or unsubstitued mono-valent alkyl groups containing one or two carbon atoms and $R_3$ is a hydroxy-substituted or unsubstituted mono-valent alkyl group containing 1–4 carbon atoms; and
   (C) 3–50 parts by weight, based on the weight of components (A) plus (C), of an alkylated aminealdehyde resin, an alkylated amide-aldehyde resin or mixtures thereof;
dissolved or dispersed in water and an organic liquid or mixture of such liquids wherein the water and said organic liquid are in a ratio of from 70:30 to 90:10 and said coating composition having a pH of 10 or above.

2. The composition of claim 1 wherein components (A), (B), and (C) comprise about 0.1–50% by weight of the coating composition.

3. The composition of claim 2 wherein said epoxy polymer comprises 65–85 parts by weight and said resin 15–35 parts by weight based on the combined weights of these two components.

4. The composition of claim 1 wherein the tertiary amine $R_1R_2R_3N$ is selected from the group consisting of: trimethyl amine, dimethyl ethanol amine, methyl diethanol amine, diethyl methyl amine, ethyl methyl ethanol amine, dimethyl benzyl amine, dimethyl propyl amine, dimethyl ethyl amine, dimethyl 3-hydroxy-1-propyl amine, dimethyl 2-hydroxy-1-propyl amine, dimethyl 1-hydroxy-2-propyl amine, and mixtures thereof.

5. The composition of claim 2 wherein said tertiary amine is trimethyl amine, dimethyl ethanol amine or mixtures thereof.

6. The composition of claim 3 wherein said tertiary amine is selected from the group consisting of: trimethyl amine, dimethyl ethanol amine, methyl diethanol amine, ethyl methyl ethanol amine, dimethyl propyl amine, dimethyl 3-hydroxy-1-propyl amine, dimethyl 2-hydroxy-1-propyl amine, dimethyl 1-hydroxy-2-propyl amine, diethyl methyl amine, and mixtures thereof.

7. The composition of claim 2 wherein the alkylated amine-aldihyde resin is hexamethylol melamine alkylted with 1–6 alkanol molecules containing 1–6 atoms.

8. A water-borne thermosetting coating composition consisting essentially of:
   (A) 50–97 parts by weight, based on the weight of components (A) plus (C), of an epoxy polymer containing, on the average, 10–150 randomly distributed 1, 2-epoxy groups per moleculy and having a weight average molecular weight, determined by gel permeation chromatography, using a polystyrene standard, of 25,000–75,000, reacted to the substantially complete consumption of the epoxy groups with
   (B) an aqueous solution of about 1–1.25 equivalents, per equivalent of epoxy group of said epoxy resin of (A), of a tertiary amine selected from the group consisting of $R_1R_2R_3N$, pyridine, N-methylpyrrole, N-methyl pyrrolidine, N-methyl morpholine, and mixtures thereof wherein $R_1$ and $R_2$ are hydroxy substituted or unsubstituted mono-valent alkyl groups containing one or two carbon atoms and $R_3$ is a hydroxy substituted or unsubstituted monovalent alkyl group containing 1–4 carbon atoms; and
   (C) 3–50 parts by weight, based on the weight of components (A) plus (C), of an alkylated amine-aldehyde resin, an alkylated amide-aldehyde resin or mixtures thereof; dissolved or dispersed in water and an organic liquid or mixture of such liquids wherein the water and said organic liquid are in a ratio of from 70:30 to 90:10, said coating composition also containing an acid catalyst selected from the group consisting of: phosphoric acid, its mono- and di- esters formed with aliphatic, cycloaliphatic, and aromatic alcohols, citric acid, para-toluenesulfonic acid, and mixtures thereof, in a quantity sufficient to lower the pH of the composition to between 7.5 and 12.

9. The composition of claim 8 wherein components (A), (B), and (C) comprise about 0.1–50% by weight of the coating composition.

10. The composition of claim 9 wherein the alkylated amine-aldehyde resin is hexamethoxymethyl melamine.

11. The composition of claim 8 wherein the tertiary amine $R_1R_2R_3N$ is selected from the group consisting of: trimethyl amine, dimethyl ethanol amine, methyl diethanol amine, diethyl methyl amine, ethyl methyl ethanol amine, dimethyl benzyl amine, dimethyl propyl amine, dimethyl ethyl amine, dimethyl 3-hydroxy-1-propyl amine, dimethyl 2-hydroxy-1-propyl amine, dimethyl 1-hydroxy-2-propyl amine, and mixtures thereof.

12. The composition of claim 8 wherein said tertiary amine is selected from the group consisting of trimethyl amine, dimethyl ethanol amine, pyridine, N-methylpyrrole, N-methyl pyrrolidine, N-methyl morpholine, and mixtures thereof.

13. The composition of claim 8 wherein said epoxy polymer is a polymer of an epoxy-functional monomer selected from the group consisting of glycidyl acrylate, glycidyl methacrylate, and allyl glycidyl ether and at least one $\alpha,\beta$-ethylenically unsaturated monomer selected from the group consisting of styrene, $C_1$–$C_8$ alkyl acrylate, $C_1$–$C_8$ alkyl methacrylate, vinyl acetate, and mixtures of one or more of these $\alpha,\beta$-ethylenically unsaturated monomers with at least one of: acrylonitrile, methacrylonitrile, acrylamide, methacrylamide, hydroxyethyl acrylate, hydroxypropyl acrylate, hydroxyethyl methacrylate, hydroxypropyl methacrylate, acrylic acid, methacrylic acid, and itaconic acid.

14. The composition of claim 13 wherein said polymer has the composition of styrene/methyl methacrylate/$C_1$–$C_8$ alkyl acrylate or $C_2$–$C_8$ alkyl methacrylate/hydroxyethyl acrylate, hydroxypropyl acrylate, hydroxyethyl methacrylate or hydroxypropyl methacrylate/glycidyl methacrylate in the weight ratios, based on the polymer, of 30-50/20-30/30-50/5-10/5-30%.

15. The composition of claim 14 wherein said polymer has an epoxy equivalent of 750–1250 wherein there is also present an acid in sufficient quantity to lower the pH of the composition to between 7.5 and 12.

16. A water-borne thermosetting coating composition consisting essentially of:
(A) 65–85 parts by weight, based on the weight of components (A) plus (C), of an epoxy polymer containing, on the average, 10–150 randomly distributed 1,2-epoxy groups per molecule and having a weight average molecular weight, determined by gel permeation chromatography, using a polystyrene standard, of 25,000–75,000; reacted to the substantially complete consumption of the epoxy groups with
(B) an aqueous solution of about 1–1.25 equivalents, per equivalent of epoxy group of said epoxy polymer of (A), of a tertiary amine selected from the group consisting of: trimethyl amine, diethyl methyl amine, dimethyl ethyl amine, dimethyl ethanol amine, methyl diethanol amine, ethyl methyl ethanol amine, dimethyl propyl amine, dimethyl 3-hydroxy-1-propyl amine, dimethyl 2-hydroxy-1-propyl amine, dimethyl 1-hydroxy-2-propyl amine, and mixtures thereof; and
(C) 15–35 parts by weight, based on the weight of components (A) plus (C), of an alkylated amine-aldehyde resin, an alkylated amide-aldehyde resin or mixtures thereof;
wherein components (A), (B) and (C) comprise about 1–40% by weight of the coating composition and the remainder is comprised of water and an organic liquid or mixtures of such liquids in a ratio of from 70:30 to 90:10 and said coating composition having a pH of 10 or above.

17. A water-borne thermosetting coating composition consisting essentially of:
(A) 70–80 parts by weight, based on the weight of components (A) plus (C), of an epoxy polymer containing, on the average, 10–150 randomly distributed 1,2-epoxy groups per molecule and having a weight average molecular weight, determined by gel permeation chromatography, using a polystyrene standard, of 25,000–75,000; reacted to the substantially complete consumption of the epoxy groups with
(B) an aqueous solution of about 1–1.25 equivalents, per equivalent of epoxy group of said epoxy resin of (A), of a tertiary amine selected from the group consisting of trimethyl amine, dimethyl ethanol amine, and mixtures thereof; and
(C) 20–30 parts by weight, based on the weight of components (A) plus (C), of a partially methylated hexamethylol melamine crosslinking agent wherein components (A), (B), and (C) comprise about 20–30% by weight of the coating composition and the remainder is comprised of water and organic liquid or mixtures of such liquids in a ratio of from 70:30 to 90:10 and said coating composition also contains sufficient phosphoric acid to lower the pH to between 7.5 and 10.

18. A water-borne thermosetting coating composition consisting essentially of:
(A) 50–65 parts by weight, based on the weight of components (A) plus (C), of an epoxy polymer containing, on the average, 10–150 randomly distributed 1,2-epoxy groups per molecule and having a weight average molecular weight, determined by gel permeation chromatography, using a polystyrene standard, of 25,000–75,000; reacted to the substantially complete consumption of the epoxy groups with
(B) an aqueous solution of about 1–1.25 equivalents, per equivalent of epoxy group of said epoxy resin of (A), of a tertiary amine selected from the group consisting of trimethyl amine, dimethyl ethanol amine, and mixtures thereof; and
(C) 35–50 parts by weight, based on the weight of components (A) plus (C), of a partially methylated hexamethylol melamine crosslinking agent,
wherein components (A), (B), and (C) comprise about 30–40% by weight of the coating composition and the remainder is comprised of water and an organic liquid or mixtures of such liquids in a ratio of from 70:30 to 90:10 and said coating composition also contains sufficient phosphoric acid to lower the pH to between 6 and 8.

19. A water-borne thermosetting coating composition consisting essentially of:

(A) 65–80 parts by weight, based on the weight of components (A) plus (C), of an epoxy polymer containing, on the average, 10–150 randomly distributed 1,2-epoxy groups per molecule and having a weight average molecular weight, determined by gel permeation chromatography, using a polystyrene standard, of 25,000–75,000; reacted to the substantially complete consumption of the epoxy groups with (B) an aqueous solution of about 1–1.25 equivalents, per equivalent of epoxy group of said epoxy resin of (A), of a tertiary amine selected from the group consisting of trimethyl amine, dimethyl ethanol amine, and mixtures thereof; and (C) 20–35 parts by weight, based on the weight of components (A) plus (C), of a mixture of alkylated amine-aldehyde resins consisting of a fully alkylated and a partially methylated hexamethylol melamine in a weight ratio range of from 1:2 to 2:1 wherein components (A), (B), and (C) comprise about 20–30% by weight of the coating composition and the remainder is comprised of water and an organic liquid or mixtures of such liquids in a ratio of from 70:30 to 90:10 and said coating composition also contains sufficient phosphoric acid to lower the pH to between 7.5 and 10.

20. A water-borne thermosetting coating composition consisting essentially of:

(A) 65–85 parts by weight, based on the weight of components (A) plus (C), of an epoxy polymer containing, on the average, 10–150 randomly distributed 1, 2-epoxy groups per molecule and having a weight average molecular weight, determined by gel permeation chromatography using a polystyrene standard, of 25,000–75,000, reacted to the substantially complete consumption of the epoxy groups with (B) an aqueous solution of about 1–1.25 equivalents, per equivalent of epoxy group of said epoxy resin of (A), of a tertiary amine selected from the group consisting of: trimethyl amine, diethyl methyl amine, dimethyl ethyl amine, dimethyl ethanol amine, methyl diethanol amine, ethyl methyl ethanol amine, dimethyl propyl amine, dimethyl 3-hydroxy-1-propyl amine, dimethyl 2-hydroxy-1-propyl amine, dimethyl 1-hydroxy-2-propyl amine, N-methyl pyrrolidine, and mixtures thereof; and (C) 15–35 parts by weight, based on the weight of components (A) plus (C), of an alkylated amine-aldehyde resin, an alkylated amide-aldehyde resin or mixtures thereof;

wherein components (A), (B), and (C) comprise about 1–40% by weight of the coating composition and the remainder is comprised of water and an organic liquid or mixtures of such liquids in a ratio of from 70:30 to 90:10, said coating composition also containing an acid catalyst selected from the group consisting of: phosphoric acid, its mono- and di-esters formed with aliphatic, cylcoaliphatic, and aromatic alcohols, citric acid, para-toluenesulfonic acid, and mixtures thereof, in a quantity sufficient to lower the pH of the composition of between 7.5 and 12.

21. A thermosetting coating composition, which is infinitely dilutable with water, consisting essentially of:

(A) 50–97 parts by weight, based on the weight of components (A) plus (C), of an epoxy polymer containing, on the average, 10–150 randomly distributed 1,2-epoxy groups per molecule and having a weight average molecular weight, determined by gel permeation chromatography, using a polystyrene standard, of 25,000–75,000, reacted, to the substantially complete consumption of the epoxy groups with (B) an aqueous solution of about 1–1.25 equivalents, per equivalent of epoxy group of said epoxy resin of (A), of a tertiary amine selected from the group consisting of $R_1R_2R_3N$, pyridine, N-methylpyrrole, N-methyl pyrrolidine, N-methyl morpholine, and mixtures thereof wherein $R_1$ and $R_2$ are hydroxy substituted or unsubstituted mono-valent alkyl groups containing one or two carbon atoms and $R_3$ is a hydroxy substituted or unsubstituted mono-valent alkyl group containing 1–4 carbon atoms; and (C) 3–50 parts by weight, based on the weight of components (A) plus (C), of an alkylated amine-aldehyde resin, an alkylated amide-aldehyde resin or mixtures thereof.

* * * * *